United States Patent [19]

Kraus

[11] Patent Number: 4,708,437

[45] Date of Patent: Nov. 24, 1987

[54] INCIDENT-LIGHT PHASE GRID AND METHOD FOR MAKING SAME

[75] Inventor: Heinz Kraus, Traunreut, Fed. Rep. of Germany

[73] Assignee: Dr. Johannes Heidenhain GmbH, Traunreut, Fed. Rep. of Germany

[21] Appl. No.: 716,396

[22] Filed: Mar. 27, 1985

[30] Foreign Application Priority Data

Apr. 6, 1984 [DE] Fed. Rep. of Germany ....... 3412980

[51] Int. Cl.⁴ ............................................. G02B 5/18
[52] U.S. Cl. .............................. 350/162.23; 350/320
[58] Field of Search ...................... 350/162.17, 162.20, 350/162.23, 320

[56] References Cited

FOREIGN PATENT DOCUMENTS 896934 5/1962 United Kingdom .

OTHER PUBLICATIONS

Dreigitterschrittgeber Dissertation by Dipl.-Ing. Jorg Willhelm, Jun. 23, 1941, (1978), pp. 19-20.

*Primary Examiner*—Bruce Y. Arnold
*Attorney, Agent, or Firm*—Willian Brinks Olds Hofer Gilson & Lione Ltd.

[57] ABSTRACT

In a process for forming an incident-light phase grid for a photoelectric positioning apparatus, a transparent substrate supports a first structured reflecting layer which is created by a photolithographic process by a first photolacquer layer exposed through an exposure mask. A whole surface thick spacer layer is applied to the structure carrying side of the substrate, and a second structured reflecting layer is formed on the spacer layer by photolithographic methods, including a second photolacquer layer which is exposed through the structured reflecting layer acting as an exposure mask.

23 Claims, 4 Drawing Figures

4,708,437

INCIDENT-LIGHT PHASE GRID AND METHOD FOR MAKING SAME

BACKGROUND OF THE INVENTION

This invention relates to incident-light phase grids, and particularly to incident-light phase grids suitable for use with a position measuring instrument.

Incident-light phase grids are used for example in photoelectric position measuring systems for measuring the relative position of two movable objects. The objects movable relative to one another may consist of two machine components of a processing machine. The phase grid can be used as a measurement embodiment in such a system.

An incident-light phase grid serves to create a desired phase displacement in light reflected off of the phase grid. That is, lightwaves of equal wavelength proceeding from adjacent grid elements always have the same, predetermined phase difference. This phase difference is created by the difference in optical path length between the two light paths, one of which is reflected off an upper reflection layer and the other which is reflected off a lower reflection layer included in the step grid of the incident-light phase grid. Such step grids are defined with a predetermined step depth in order to obtain the desired phase difference.

The paper of J. Wilhlem entitled "Dreigitterschrittgeber" (1978, pages 19 and 20) describes a phase grid composed of two amplitude grids mounted with a corresponding displacement. In this system, under one amplitude grid there is additionally laid a phase layer.

SUMMARY OF THE INVENTION

The present invention is directed to an improved transmitted-light phase grid of the type described initially above, which provides a particularly stable construction and permits relatively simple production, without adjustments.

According to this invention, an incident-light phase grid is provided which comprises a transparent spacer layer and first and second reflecting layers. Each of the reflecting layers is arranged on a respective side of the spacer layer, and at least one of the two reflecting layers defines an amplitude grid. This invention is also directed to methods for fabricating the incident-light phase grid of this invention.

This invention provides important advantages in that an echelon grating with a predetermined step depth is eliminated, and only relatively thin reflection layers have to be structured. Furthermore, the phase difference between the two reflecting layers remains unaffected by the structuring process, since the step depth is determined only by the thickness of the transparent spacer layer. For this reason, the incident-light phase grid of this invention eliminates profile or flank problems that can arise in the case of an echelon grating of a conventional incident-light phase grid. In the event both reflecting layers are structured, no problems of alignment arise with regard to exposure masks, since the second reflecting layer is structured with the aid of the first reflecting layer, acting as an exposure mask. The present invention provides a stably constructed incident-light phase grid having optimal interference properties, which properties are not impaired by accumulated dirt, since the transparent spacer layer with the outward-facing reflecting layer presents a quasi-planar surface. Further advantageous features of this invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
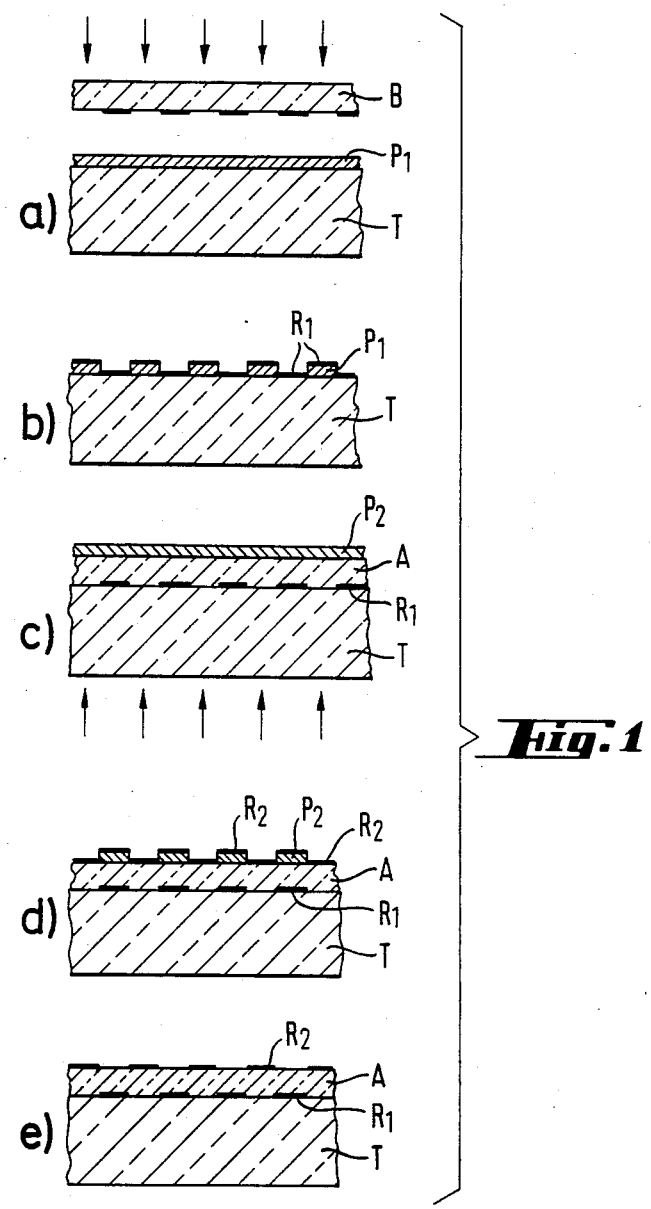
FIG. 1 shows sequential process steps for the production of a first preferred embodiment of the incident-light phase grid of this invention, which includes two structured reflecting layers.

Turning now to the drawings, FIG. 1 shows sequential process steps for the production of a first preferred embodiment of the incident-light phase grid of this invention, which includes two structured reflecting layers $R_1$, $R_2$, each of which defines a respective amplitude grid.

A transparent substrate or carrier layer T (which may for example be formed of glass) is provided, and a first photolacquer layer $P_1$ is applied to this substrate T. The photolacquer layer $P_1$ is exposed through an exposure mask B in order to define a desired line grid pattern on the photolacquer layer $P_1$ (FIG. 1, step a) The exposed photolacquer layer $P_1$ is developed so as to remove portions thereof and a first reflecting layer $R_1$ is then applied to the developed first photolacquer layer $P_1$ (FIG. 1, step b). Then remaining portions of the first photolacquer layer $P_1$ are removed, together with overlying portions of the first reflecting layer $R_1$. In this way, a first amplitude grid is formed. Then a whole surface, uniformly thick, transparent spacer layer A is applied to the structure carrying side of the substrate T, and a second positive photolacquer layer $P_2$ is applied to the spacer layer A. This second photolacquer layer $P_2$ is exposed through the transparent substrate T and the remaining portions of the reflecting layer $R_1$ (FIG. 1, step c). The second photolacquer layer $P_2$ is then developed so as to remove portions thereof and a second reflecting layer $R_2$ is applied over remaining portions of the second photolacquer layer $P_2$ and the exposed surfaces of the transparent spacer layer A (FIG. 1, step d). Finally, remaining portions of the second photolacquer layer $P_2$ are removed, along with the overlying portions of the second reflecting layer $R_2$ (FIG. 1, step e).

Figure 2:
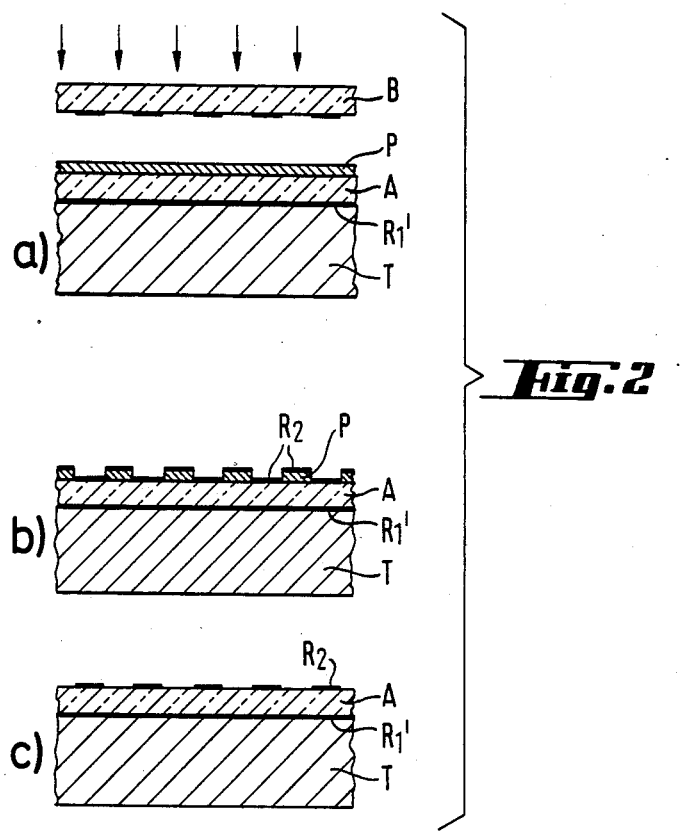
FIG. 2 shows sequential process steps for the production of a second preferred embodiment of the incident-light phase grid of this invention, which includes a single structured reflecting layer.

FIG. 2 shows the sequential process steps for the production of a second preferred embodiment of the incident-light phase grid of this invention. This embodiment includes a structured reflection layer $R_2$ which acts as an amplitude grid.

In this embodiment, a transparent or opaque carrier layer or substrate T is provided, which can for example be formed of glass or aluminum. A whole surface first reflection layer $R_1'$ is applied over the substrate T, and a uniformly thick spacer layer A is applied over the first reflection layer $R_1'$. A photolacquer layer P is applied to the spacer layer A, and this photolacquer layer P is exposed with an exposure mask B in order to define the desired grid structure (FIG. 2, step a). The photolacquer layer P is then developed and a second reflecting layer $R_2$ is applied over the developed photolacquer layer P (FIG. 2, step b). The remaining portions of the photolacquer layer P are then removed, along with overlying portions of the second reflecting layer $R_2$ (FIG. 2, step c). In this way, the second reflecting layer $R_2$ is structured as an amplitude grid which defines alternating reflecting strips and photopermeable strips.

Figure 3:
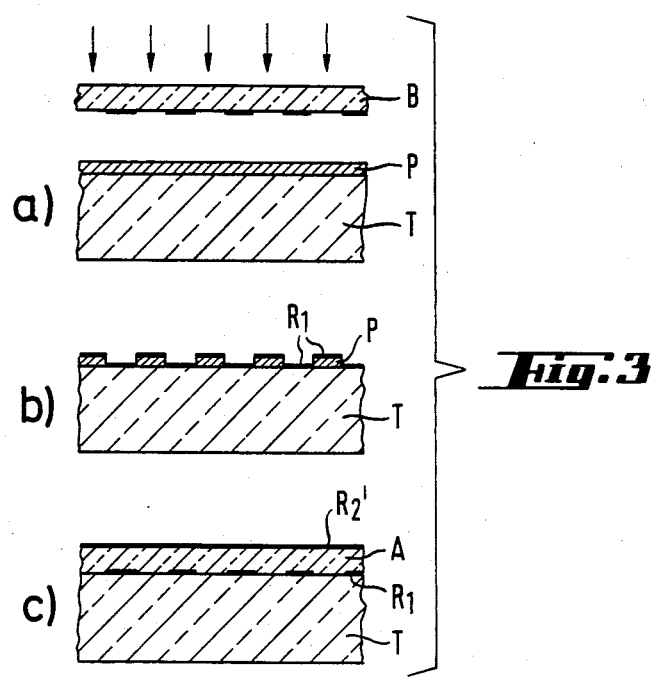
FIG. 3 shows sequential process steps for the production of a third preferred embodiment of the incident-light phase grid of this invention, which also includes a single structured reflecting layer.

FIG. 3 shows various process steps for the production of a third embodiment of the incident-light phase grid of this invention. This embodiment includes a structured reflecting layer $R_1$ as an amplitude grid. In this embodiment, a transparent carrier layer or substrate T is provided which may for example be formed of glass. A photolacquer layer P is applied to the substrate T and is exposed via an exposure mask B in order to define the desired structure (FIG. 3, step a). The photolacquer layer P is developed and a first reflecting layer $R_1$ is applied over the developed photolacquer layer P (FIG. 3, step b). Then remaining portions of the photolacquer layer P are removed, along with overlying portions of the first reflecting layer $R_1$. A whole surface, uniformly thick spacer layer A is then applied to the structure carrying side of the substrate T, and a second reflecting layer $R_2'$ is appied over the spacer layer A.

The spacer layer A extending over substrate T with a constant thickness makes it possible to provide exactly parallel spacing between the two relecting layers $R_1$, $R_2$; $R_1'$, $R_2$; $R_1$, $R_2'$. In this way, optimal interference properties are provided to the incident-light phase grid. This parallel spacing deined by the spacer layer A forms the "step depth" of the incident-light phase grid and is chosen according to the desired phase displacement.

The incident-light phase grid shown in FIG. 1 step e includes two reflecting layers $R_1$, $R_2$ which are offset with respect to one another, both of which define amplitude grids. This phase grid is usable with a transparent substrate T from both sides. In the incident-light phase grid shown in FIG. 2, step c, only the second reflecting layer $R_2$ is formed as an amplitude grid, while the unstructured first reflecting layer $R_1'$ extends over the whole surface of the substrate T. For this reason, this incident-light phase grid can only be used on the side of the second reflecting layer $R_2$ as an amplitude grid. The substrate T can therefore be made either transparent or opaque.

The incident-light phase grid shown in FIG. 3 step c includes a first reflecting layer $R_1$ which is formed as an amplitude grid, while the unstructured second reflecting layer $R_2'$ extends over the whole surface of the substrate T. For this reason, this incident-light phase grid can be used only on the side of the first reflecting layer $R_1$ as an amplitude grid. For this reason, the substrate T must be transparent.

In the structuring of the two reflecting layers $R_1$, $R_2$ as shown in FIG. 1, no adjustment or alignment problems arise with respect to the exposure mask. This is because only a single exposure mask B is required for the structuring of the first reflecting layer $R_1$. The second reflecting layer $R_2$ is structured with the aid of the first reflecting layer $R_1$. In this way, the second positive photolacquer layer $P_2$ yields an exact alignment with regard to the displacement between the two reflecting layers $R_1$, $R_2$.

Since the outside-lying surface of the transparent spacer layer A presents with the second reflecting layer $R_2$, $R_2'$ a quasi-planar surface, the interference properties of the incident-light phase grid are not impaired by the accumulation of dirt. For additional protection against mechanical damage, this surface of the spacer layer A can be covered (along with the second reflecting layer $R_2$, $R_2'$) with a cover layer D held in place by a cement layer K (FIG. 4).

Figure 4:
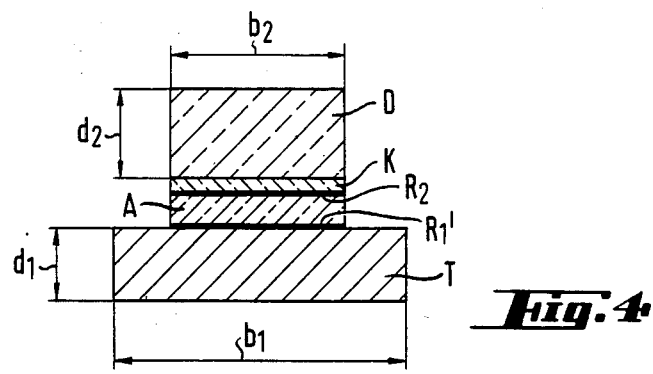
FIG. 4 shows a fourth embodiment of the incident-light phase grid of this invention, which includes a cover layer.

In FIG. 4, there is shown in cross section an incident-light phase grid of the type shown in FIG. 2 with the addition of a transparent cover layer D of glass. This cover layer D is joined to the transparent spacer layer A and the second reflecting layer $R_2$ by a cement layer K of optical cement. In this embodiment, the opaque substrate T is formed of aluminum. The cross sectional dimensions $b_1 \cdot d_1$ and $b_2 \cdot d_2$ of the substrate T and the cover layer D are such that the substrate T and the cover layer D define the same bending resistance S:

$$S = E_1(b_1 \cdot d_1^3/12) = E_2(b_2 \cdot d_2^3/12),$$

where E = the modulus of elasticity.

The equal bending resistance S of the substrate T and the cover layer D assures that the transparent spacer layer A with the two reflection layers $R_1'$, $R_2$ is positioned at the neutral plane of the incident-light phase grid. When this is the case, bending of the incident-light phase grid causes minimal elongation or stretching of the reflecting layers $R_1'$, $R_2$. The incident-light phase grid of FIG. 4 therefore assures a high accuracy of measurement when used in position measuring devices.

The transparent spacer layer A is preferably formed of a dielectric material such as $MgF_2$, SiO, or glass. The two reflecting layers $R_1$, $R_2$, $R_1'$, $R_2'$ are preferably formed of a metal such as chromium or gold.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. An incident-light phase grid comprising:
   a transparent spacer layer; and
   first and second reflecting layers, each arranged on a respective side of the spacer layer, at least one of the two reflecting layers defining an amplitude grid.

2. The invention of claim 1 wherein each of the reflecting layers defines a respective amplitude grid.

3. The invention of claim 1 wherein the spacer layer comprises a dielectric material.

4. The invention of claim 3 wherein the spacer layer is formed from a material selected from the group consisting of $MgF_2$, SiO, and glass.

5. The invention of claim 1 wherein the first reflecting layer is applied to a substrate and at least one cover layer is disposed on the second reflecting layer.

6. The invention of claim 5 wherein the cover layer is secured to the second reflecting layer by a cement layer.

7. The invention of claim 5 wherein the cement layer is formed of an optical cement.

8. The invention of claim 4 wherein the substrate and the cover layer are equally bending resistant.

9. The invention of claim 8 wherein the equal bending resistance of the substrate and the cover is such that the transparent spacer layer is positioned at the neutral plane of the incident-light phase grid and bending of the incident-light phase grid causes minimal physical alteration of the first and second reflecting layers.

10. The invention of claim 1 wherein each of the reflecting layers is formed from a metal selected from the group consisting of chromium and gold.

11. A process for producing an incident-light phase grid comprising the following steps:
 (a) applying a first photolacquer layer to a transparent substrate wherein the photolacquer layer is either of the positive or negative type, exposing the first photolacquer layer with an exposure mask that defines a grid pattern, and developing the first photolacquer layer to thereby remove portions thereof;
 (b) applying a first reflecting layer over the developed first photolacquer layer;
 (c) removing remaining portions of the first photolacquer layer, along with overlying portions of the first reflecting layer, to form a first amplitude grid;
 (d) applying a whole surface spacer layer over the first reflecting layer and the substrate;
 (e) applying a positive photosensitive type, second photolacquer layer over the spacer layer, exposing the second photolacquer layer by means of the first amplitude grid through the substrate and the spacer layer, and developing the second photolacquer layer to thereby remove portions thereof;
 (f) applying a second reflecting layer over the developed second photolacquer layer; and
 (g) removing remaining portions of the second photolacquer layer, along with overlying portions of the second reflecting layer, to form a second amplitude grid.

12. The process of claim 10 wherein step (d) comprises applying a uniformly thick spacer layer.

13. The process of claim 10 wherein step (d) comprises applying a spacer layer which varies in thickness.

14. The invention of claim 11 wherein the process further comprises the following step:
 (h) applying a cover layer to the second reflecting layer such that the substrate and the cover layer are of equal bending resistance.

15. A process for producing an incident-light phase grid comprising the following steps:
 (a) applying a first reflecting layer to a substrate;
 (b) applying a whole surface spacer layer over the first reflecting layer;
 (c) applying a photolacquer layer over the spacer layer, exposing the photolacquer layer with an exposure mask that defines a grid pattern, and developing the photolacquer layer to thereby remove portions thereof;
 (d) applying a second reflecting layer over the developed photolacquer layer; and
 (e) removing remaining portions of the photolacquer layer, along with overlying portions of the second reflecting layer, to form an amplitude grid.

16. The process of claim 15 wherein step (b) comprises applying a uniformly thick spacer layer.

17. The process of claim 15 wherein step (b) comprises applying a spacer layer which varies in thickness.

18. The invention of claim 15 wherein the process further comprises the following step:
 (f) applying a cover layer to the second reflecting layer such that the substrate and the cover layer are of equal bending resistance.

19. A process for producing an incident-light phase grid comprising the following steps:
 (a) applying a photolacquer layer to a transparent substrate, exposing the photolacquer layer with an exposure mask that defines a grid pattern, and developing the photolacquer layer to thereby remove portions thereof;
 (b) applying a first reflecting layer over the developed photolacquer layer;
 (c) removing remaining portions of the photolacquer layer, along with overlying portions of the first reflecting layer, to form an amplitude grid;
 (d) applying a whole surface spacer layer over the amplitude grid and exposed portions of the substrate; and
 (e) applying a second reflecting layer to the spacer layer.

20. The process of claim 19 wherein step (d) comprises applying a uniformly thick spacer layer.

21. The process of claim 19 wherein step (d) comprises applying a spacer layer which varies in thickness.

22. The invention of claim 19 wherein the process further comprises the following step:
 (f) applying a cover layer to the second reflecting layer such that the substrate and the cover layer are of equal bending resistance.

23. An incident-light phase grid comprising:
 a transparent spacer layer having selected optical and dielectric properties and defining a first and second surface;
 a first reflecting layer defining a first amplitude grid and located on the first surface of the spacer layer;
 a second reflecting layer defining a second amplitude grid and located on the second surface of the spacer layer;
 a substrate of selected optical and dielectric properties located on the first reflecting layer; and
 a cover layer of selected optical and dielectric properties located on the second reflecting layer;
 the substrate and cover layer cooperating such that bending of the phase grid causes minimal distortion of the first and second reflecting layers.

* * * * *